United States Patent [19]
Heudorfer et al.

[11] Patent Number: 5,984,852
[45] Date of Patent: Nov. 16, 1999

[54] METHOD FOR ACCOMMODATING AN AIRBAG OF AN AIRBAG APPARATUS IN A CONTAINER

[75] Inventors: Benedikt Heudorfer, Nersingen; Frank Mueller, Blaustein; Martin Ritter, Neu-Ulm, all of Germany

[73] Assignee: Takata (Europe) Vehicle Safety Technology GmbH, Ulm, Germany

[21] Appl. No.: 08/914,141

[22] Filed: Aug. 19, 1997

[30] Foreign Application Priority Data

Aug. 19, 1996 [DE] Germany ............... 196 33 387

[51] Int. Cl.⁶ .................. B31B 1/52; B60R 21/16
[52] U.S. Cl. ............... 493/457; 493/449; 53/429; 280/728.1; 280/743.1
[58] Field of Search .................. 53/429, 116, 117, 53/244; 493/457, 449, 458; 280/743.1, 728.1

[56] References Cited

U.S. PATENT DOCUMENTS

| | | |
|---|---|---|
| 4,351,544 | 9/1982 | Ross . |
| 5,022,675 | 6/1991 | Zelenak, Jr. et al. ............ 280/743 |
| 5,364,126 | 11/1994 | Kuretake et al. ............ 280/730 R |
| 5,391,137 | 2/1995 | DePoy et al. . |
| 5,425,552 | 6/1995 | Linder ............ 280/743.1 |
| 5,456,651 | 10/1995 | Baker et al. . |
| 5,492,367 | 2/1996 | Albright et al. ............ 280/743.1 |
| 5,613,348 | 3/1997 | Lunt et al. ............ 53/429 |
| 5,671,935 | 9/1997 | Berger et al. ............ 280/743.1 |

FOREIGN PATENT DOCUMENTS

| | | |
|---|---|---|
| 2 154 234 | 5/1973 | France . |
| 2 043 255 | 3/1971 | Germany . |
| 44 22 276 | 12/1994 | Germany . |
| 44 40 845 | 5/1996 | Germany . |
| 97/28024 | 8/1997 | WIPO . |

*Primary Examiner*—John Sipos
*Assistant Examiner*—Steven Jensen
*Attorney, Agent, or Firm*—Foley & Lardner

[57] ABSTRACT

The invention relates to a method for accommodating an airbag of an airbag apparatus into a container. The folding method employed allows the airbag to folded into a small container, yet ensures that the airbag will inflate in a substantially uniform and jerk-free manner. The method is still fairly cost effective. A preferred embodiment encompasses inserting a first plunger into an opening in a lower half of the airbag such that it pushes the upper part away from the lower part. The upper part is then clamped between the first plunger and a second plunger. Next, the airbag is folded upward such that a plurality of radial folds is created, which are then folded inward. A hollow die is then placed over the folded airbag. The upper end of the airbag and a central portion of the airbag are twisted in different directions while a third plunger is placed over the end face of the folded airbag. The third plunger is then used to compress the airbag. The third plunger is then removed while a container is placed over the compacted airbag and the die is removed.

11 Claims, 8 Drawing Sheets

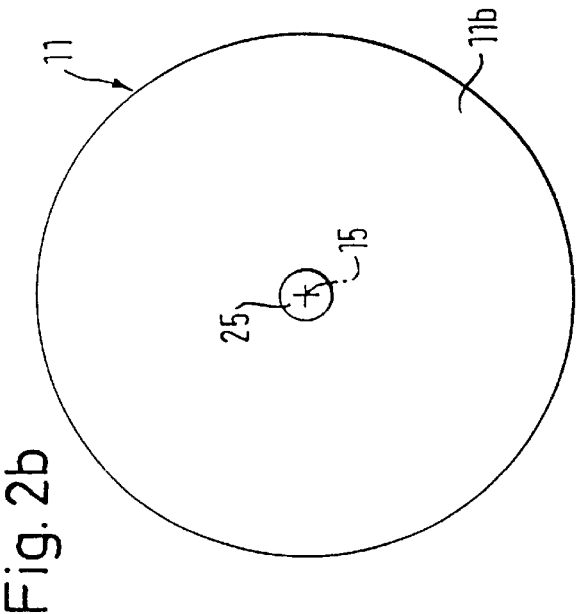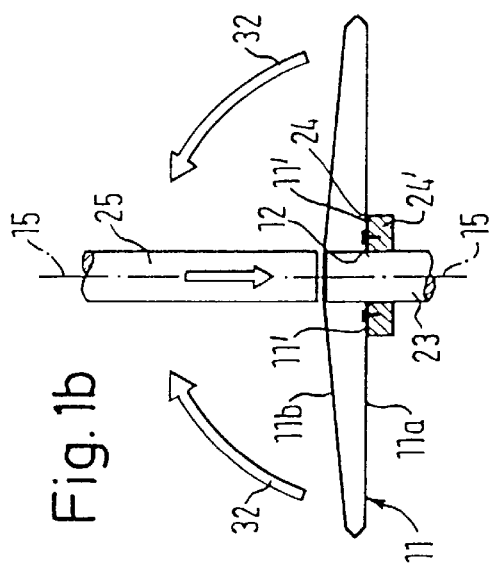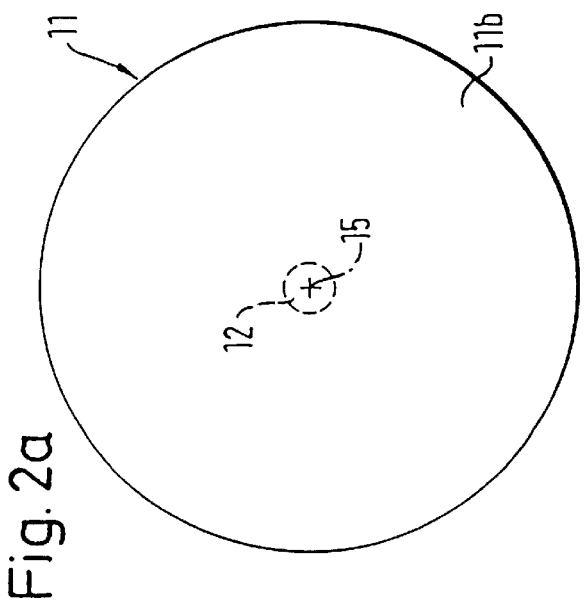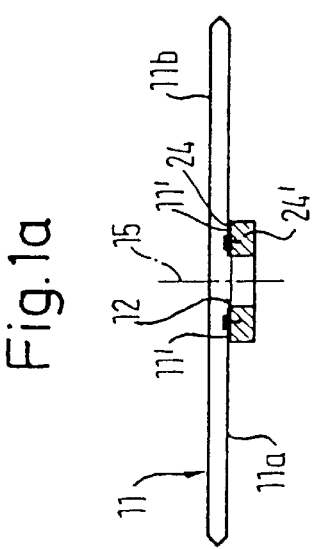

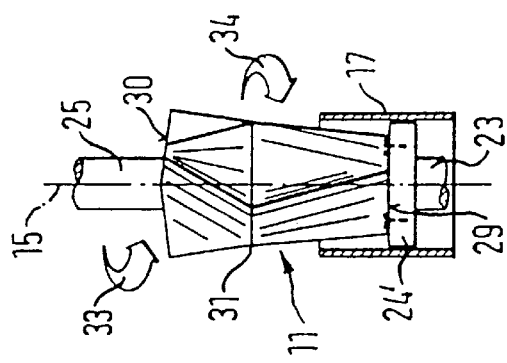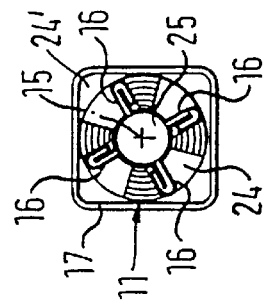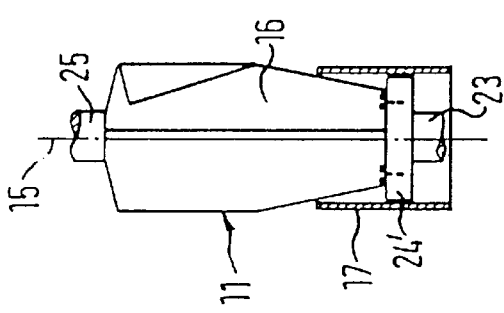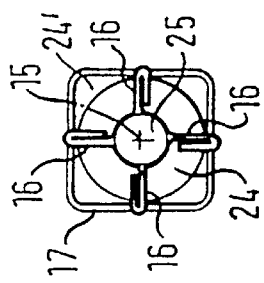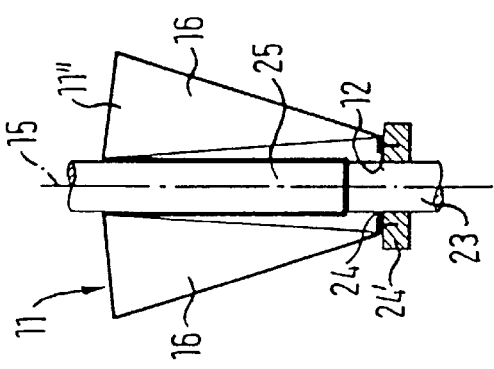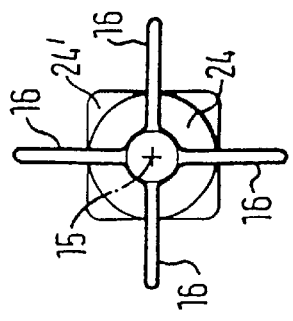

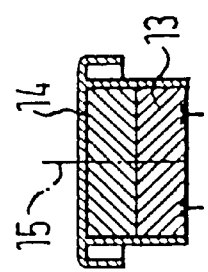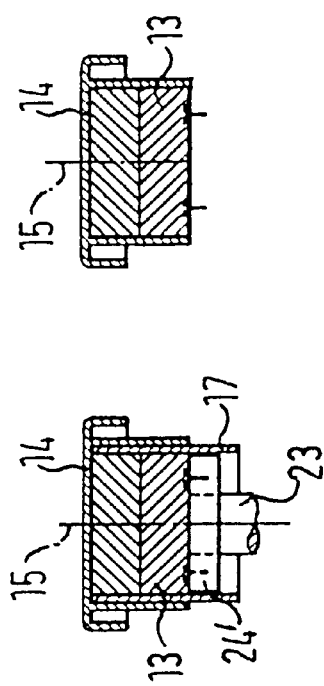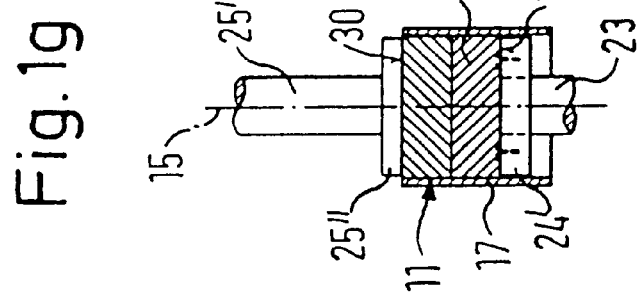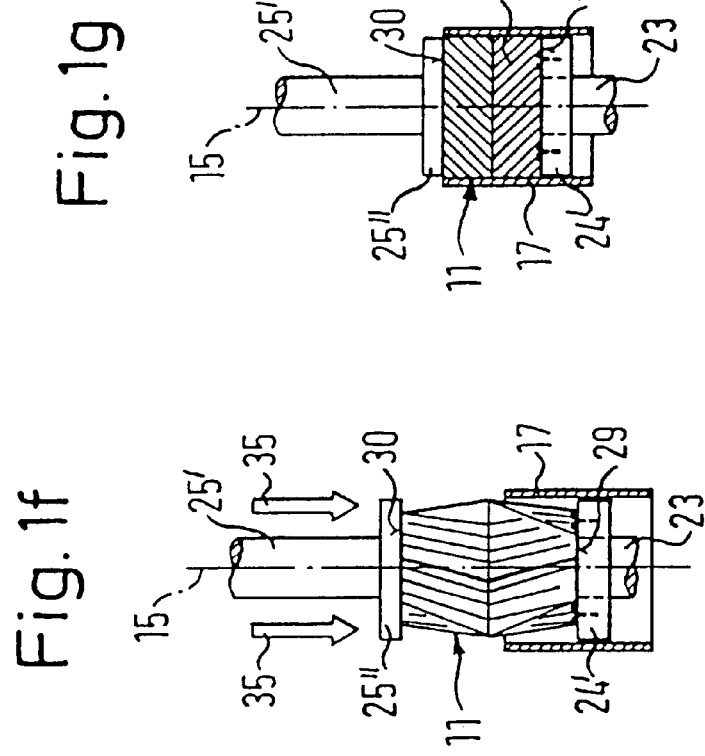

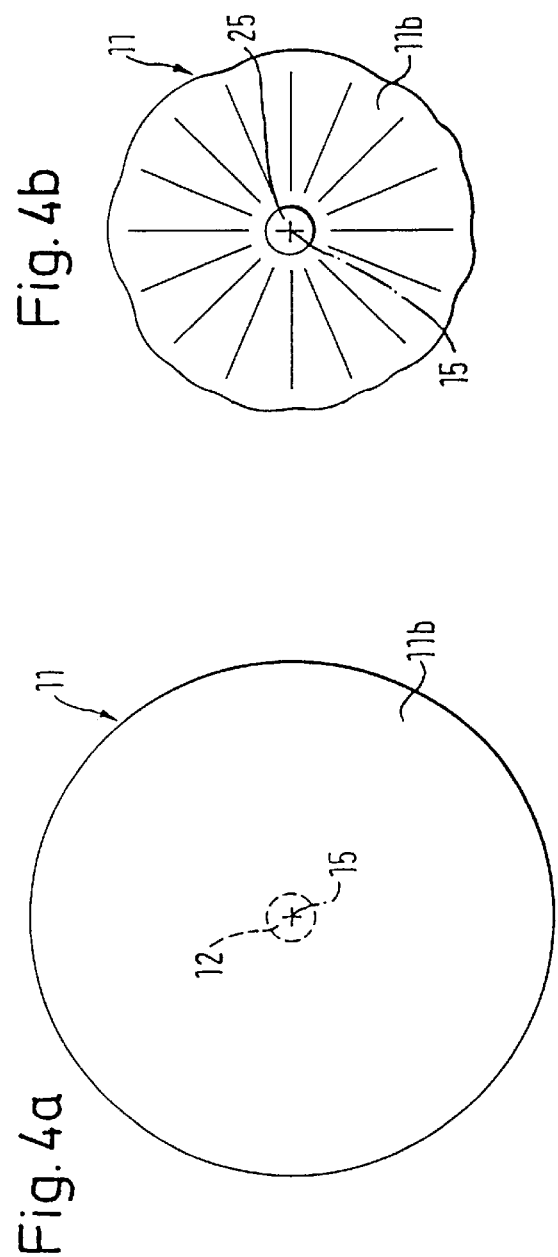

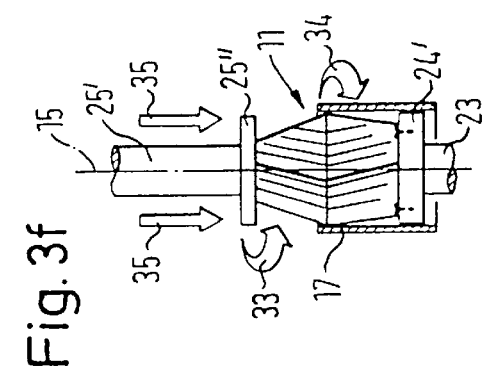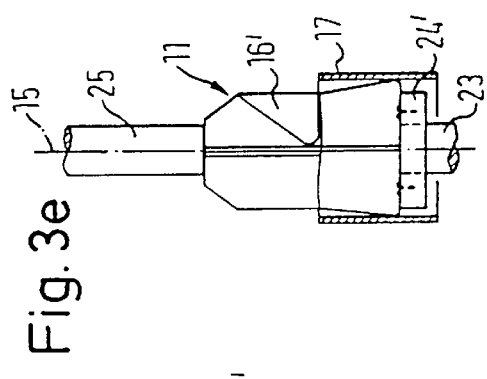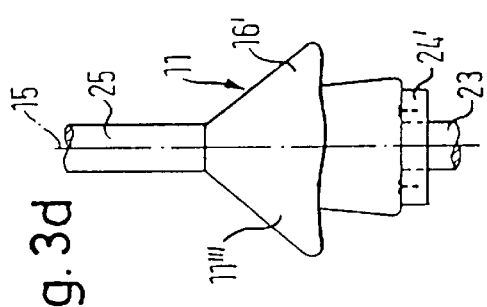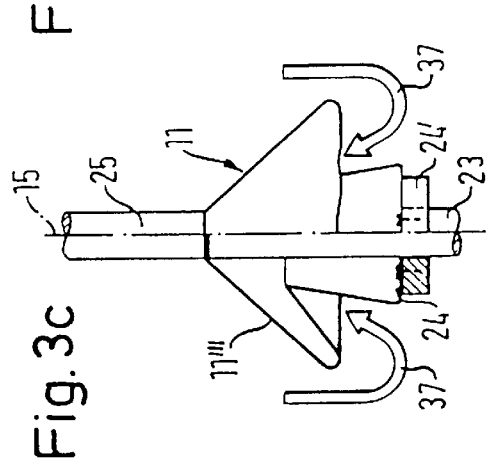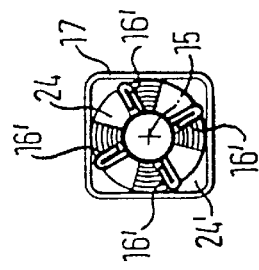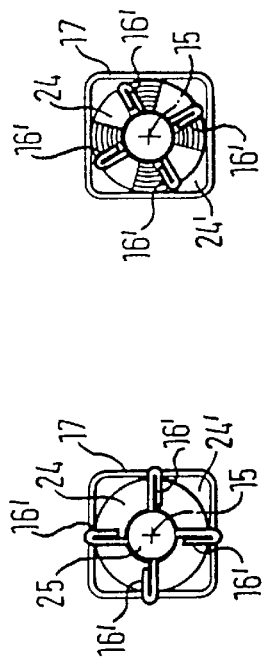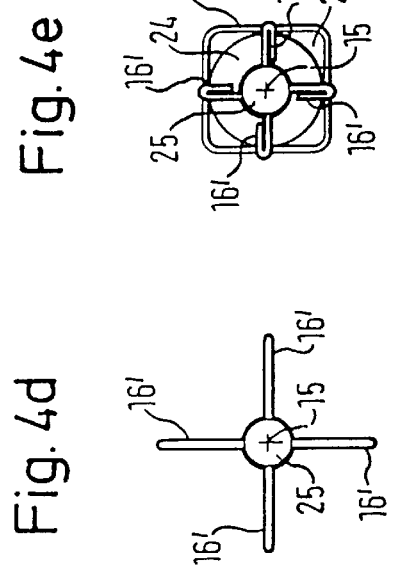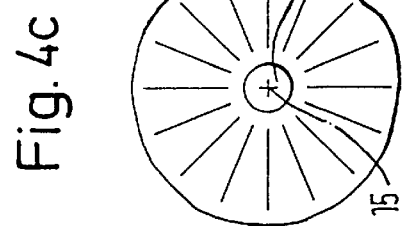

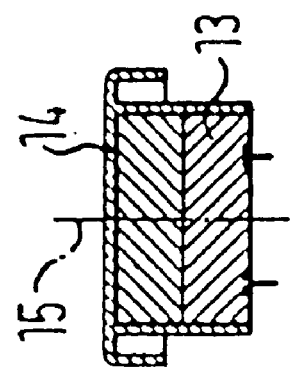
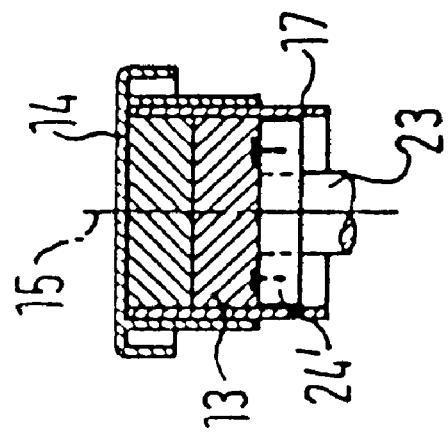
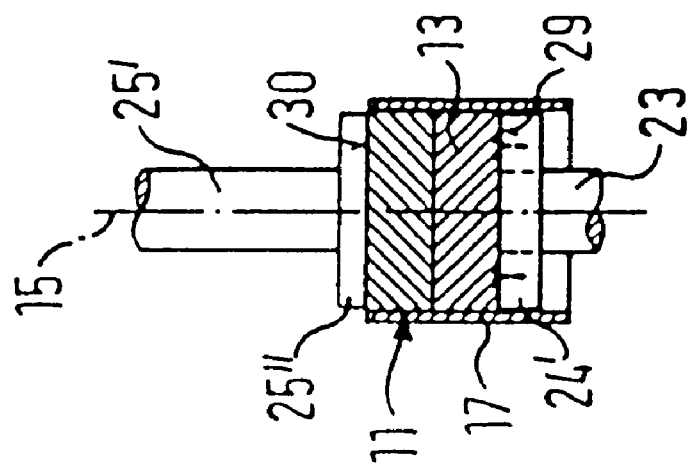

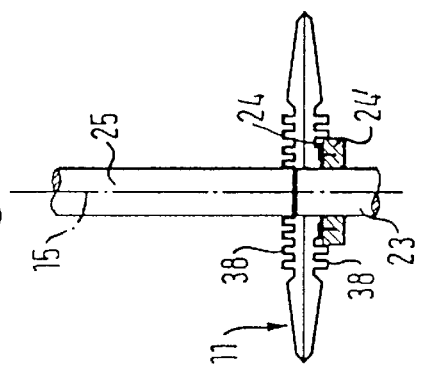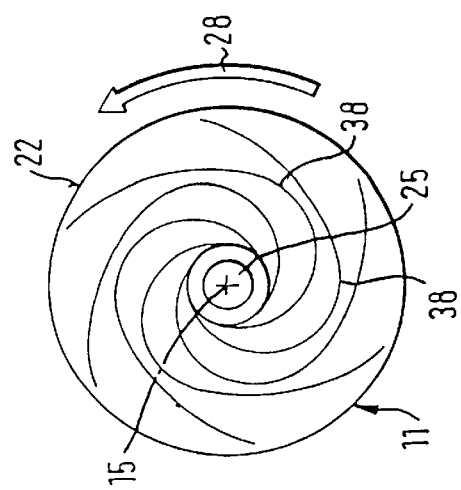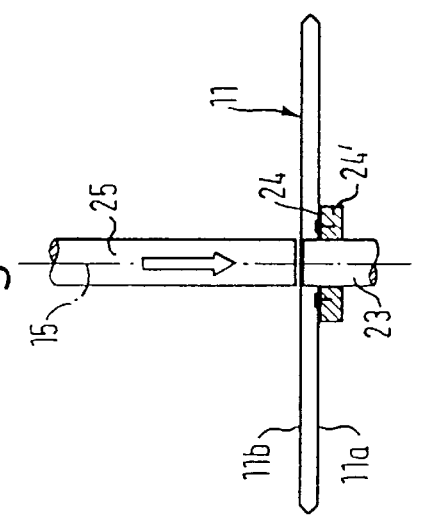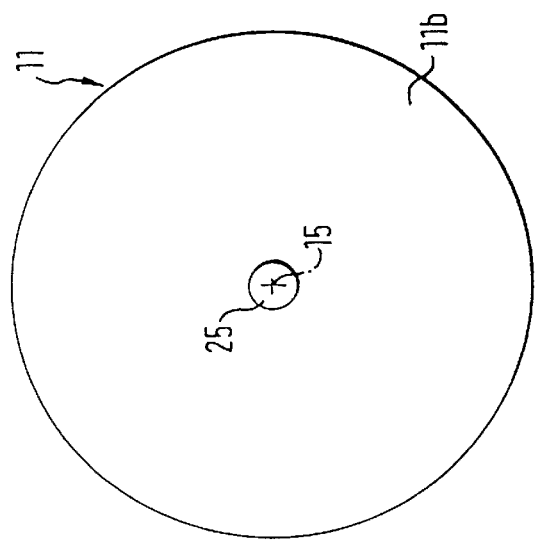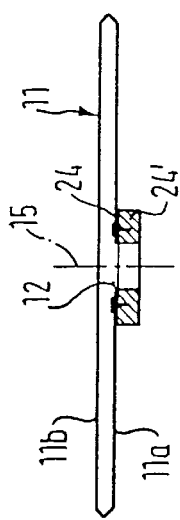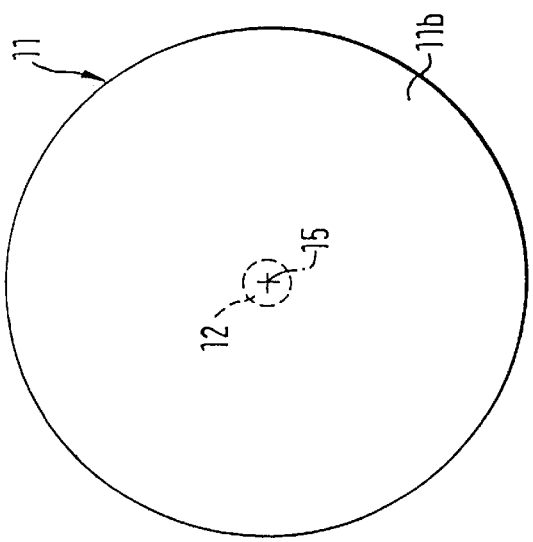

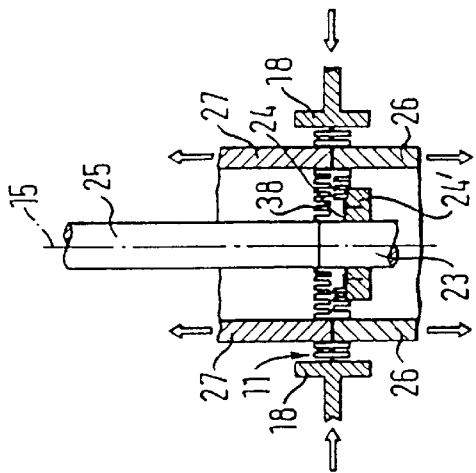
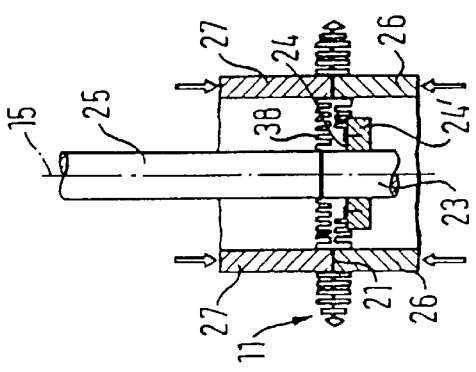
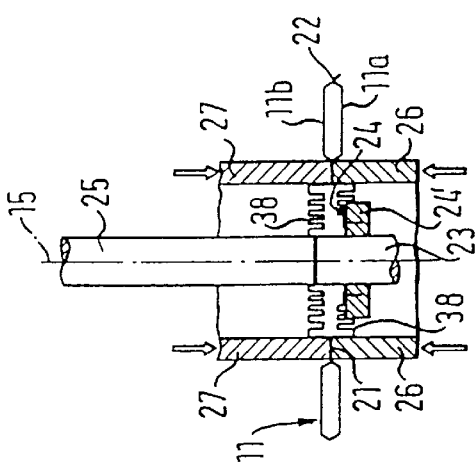
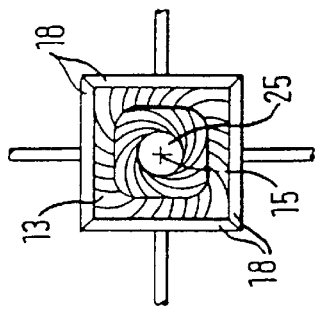
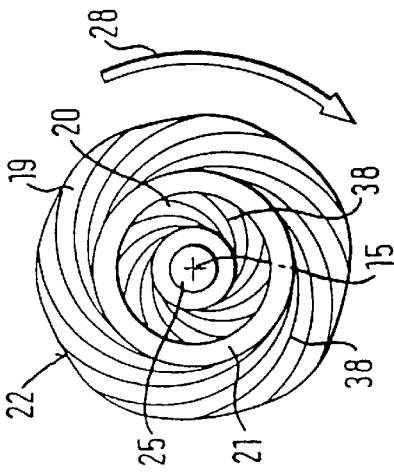
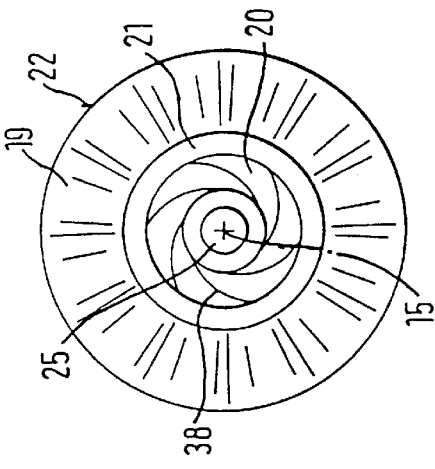

METHOD FOR ACCOMMODATING AN AIRBAG OF AN AIRBAG APPARATUS IN A CONTAINER

BACKGROUND OF THE INVENTION

1. Field of the Invention

The invention relates to a method and an apparatus for accommodating an airbag of an airbag apparatus for motor vehicles in a container which can be broken open.

2. Description of Related Art

It is important that airbags of airbag systems are folded together into a package that is as compact as possible to save as much space as possible when accommodating the airbag in an automobile. It must be ensured, however, that folding the airbag is done in a manner such that, when the gas generator is triggered due to an accident, the airbag inflates rapidly and without any problems so that the vehicle occupants are protected throughout the accident.

SUMMARY OF THE INVENTION

Accordingly, it is therefore a general object of the invention to provide a method for folding an airbag which will obviate or minimize difficulties of the type previously described.

It is an object of the invention to provide a method for folding an airbag in a simple manner into a compact package.

A preferred embodiment of the method which is intended to accomplish at least some of the foregoing objects includes the steps of: (a) providing an airbag, which is formed by two flexible sheets lying flat against one another and being connected together at their peripheries, wherein one of said sheets has an opening with a central axis for receiving a gas generator; (b) spacing the sheets of the airbag in a direction of the axis of the opening, so that at least a small cavity between the sheets is formed; (c) rotating different regions of the airbag relative to each other about the axis of the opening to fold the airbag into a compact packet, said regions being spaced apart axially and/or radially from one another; and (d) arranging the airbag after folding it into said compact packet in the container.

Additional objects and advantages of the invention will be set forth in the description which follows, and in part will be obvious from the description, or may be learned by practicing the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute part of the specification, illustrate a presently preferred embodiment of the invention, and, together with the general description above and the detailed description of the preferred embodiments given below, serve to explain the principles of the invention in which:

FIGS. 1a to 1i are schematic and partly sectional side views of an airbag of an airbag system in accordance with the invention and also of the elements of the apparatus used for its manufacture in the different phases of the method of the invention;

FIGS. 2a to 2e are plan views of FIGS. 1a to 1e;

FIGS. 3a to 3i are schematic and partly sectional side views of a further embodiment of an airbag in accordance with the invention and of the apparatus used for its manufacture in the various phase of the manufacturing method of the invention:

FIGS. 4a to 4f are plan views of FIGS. 3a to 3f;

FIGS. 5a to 5f are side views of a further embodiment of an airbag in accordance with the invention with the apparatus used for its manufacture in different steps of the method of the invention, and FIGS. 6a to 6f are plan views of FIGS. 5a to 5f.

BRIEF DESCRIPTION OF THE PREFERRED EMBODIMENTS

Referring now to the drawings, wherein like numerals indicate like parts, and initially to FIGS. 1a and 2a, there will be seen an airbag 11 comprising two circular disc-like, flexible sheets 11a, 11b. The two flexible sheets 11a, 11b, for example, are comprised of a suitable fabric and are connected together, sewn, for example, at their respective peripheral edges. The lower sheet 11a has a central, circular opening 12, around which an airbag retaining disc 24 is provided. The sheet material 11' is firmly connected to the retaining disc 24. The airbag retaining disc 24, together with a clamping device 24', holds the airbag during folding and/or installation, which is described hereinafter. Moreover, the airbag retaining disc 24 can be used to connect the airbag to the gas generator (not illustrated).

In accordance with FIG. 1b, a first plunger 23, preferably, having a circular cross-section is pushed into the central opining 12 of the lower sheet 11a, which is surrounded by the airbag retaining disc 24. The first plunger 23 likewise passes through a central opening in the clamping device 24', thereby preventing the clamping device 24' from rotating relative to the first plunger 23. Moreover, the first plunger 23 abuts the upper sheet 11b from below substantially at the center of the upper sheet 11b and, as a result, the airbag 11 is drawn or pushed apart somewhat in the direction of the central axis 15 of the opening 12.

A second plunger 25, which has dimensions corresponding to those of the first plunger 23, is arranged on the opposite upper side of the upper sheet 11b with its lower end face opposite to the upper end face of the first plunger 23. When the second plunger 25 is lowered further, the central region of the upper sheet 11b is clamped between the two end faces of the first and second plungers 23, 25.

As shown in FIG. 1b and 1c, a means 32, which is illustrated by arrows, now engages the regions of the airbag 11 located radially outside of the airbag retaining disc 24 and folds these regions upwardly. The radially outside regions of the airbag 11 are folded such that they extended substantially parallel to the axis 15. The means 32 thereby ensures not only upward pivoting but also ensures that the upwardly pivoted regions will be folded such that, for example, four or more radial folds 16 are created, each of which is arranged at corresponding equal angles relative to the other folds. Thereafter, in accordance with FIGS. 1d and 2d, each fold 16 is folded once again inwardly by about 180°. As a result, the radial length of the folds 16 is approximately halved.

At the same time or shortly thereafter, a hollow die or former 17 is pushed from below over the clamping device 24'. As seen from the figures, the hollow die 17 has a square cross-section, which circumscribes the outer periphery of the clamping device 24'. The airbag retaining disc 24 may be circular. The hollow die 17 extends above the clamping device 24 to form a space inside the upper part of the hollow die 17 so that the airbag packet 13 can be formed as shown in FIGS. 1g to 1i.

Next, as shown in FIG. 1e, a first twisting means 33 is engaged with the upper end face 30 of the folded airbag 11 and a second twisting means is engaged with a central region 31 of the folded airbag 11. The twisting means 33, 34 twist in opposite directions as indicated by the arrows in FIG. 1e. The lower end face 29 of the airbag 11 is held firmly against rotation by the plunger 23 and the clamping device 24', which is connected to the airbag retaining disc 24.

At the same time, as shown in FIG. 1f, a flange 25", which is provided either at the plunger 25 or at a further plunger 25', engages the end face 30 of the folded airbag 11 from above. The plunger 25' with the flange 25" is pushed downward in the direction of the arrow 35 in FIG. 1f simultaneously or not simultaneously with the rotational movement of the first and second twisting means 33, 34. The airbag 11, therefore, is twisted in the opposite direction and compressed. By suitably dimensioning the hollow die 17, the airbag is, in this arrangement, finally accommodated in a compact manner in the form of a structure which has been multiply folded and relatively twisted around the axis 15.

Finally, the plunger 25' with the flange 25" is removed and a container or cap 14, which can be broken open, is mounted onto the hollow die 17 from above. The hollow die 17 is removed from below as shown in FIG. 1i. After removing the clamping device 24' and the airbag retaining disc 24 to the lower edge of the cap 14, the airbag packet is ready for installation.

An important function of the first plunger 23, which retains its starting position until the packet 13 has been completed, is to create a continuous hollow cavity in the airbag packet 13 extending approximately to the upper fabric sheet 11b and lying axially opposite the opening 12. As a result, when the gas generator is connected and triggered, the pressurized gases can reach the upper central region of the airbag 11 without delay and the laterally folded regions of the airbag 11 in an ideal manner.

A second embodiment according to the invention will be described with reference to FIGS. 3a to 3i and 4a to 4f. An initial difference between the second embodiment and the first embodiment, as seen in FIGS. 3b and 4b, is that the lower first plunger 23 is inserted considerably further upward through the ring-disc arrangement 24 in the first phase of the method. As a result, as seen in FIG. 3b, a double-conical structure is initially created, which is comprised of fabric sheets 11a and 11b.

This conical structure is then folded as shown in FIG. 3c in a direction demonstrated by arrows 37 such that an umbrella-like structure 11''' is formed. The umbrella-like structure 11''' is also folded, simultaneously or subsequently, in a radial-like manner as shown in FIGS. 3d and 4d, thereby creating radial folds 16'. The radial folds 16', which overlap in umbrella-like manner, can then be folded again onto one another as shown in FIGS. 3e and 4e. The method of the second embodiment corresponds in all other respects to that of the first embodiment, which was described with reference to FIGS. 1 and 2.

A third embodiment will now be described with reference to FIGS. 5a to 5f and 6a to 6f. In the third embodiment, the flat airbag 11 is rotationally folded, as shown in FIGS. 5a, 5b, 6a, and 6b, such that the lower plunger 23 is initially introduced into the airbag retaining disc 24 to such an extent that it only touches the upper sheet 11b, but does not push or draw apart the airbag 11 axially. The outer plunger 25 again presses against the upper end face of the first plunger 23 so that the sheet 11b is clamped in the central region between the two plungers 23, 25.

A turning means 28 now engages in the region of the outer periphery 22 of the flat airbag 11 while the plungers 23, 25 and the airbag retaining disc 24 are secured against rotation. Spiral-like folds, as shown in FIG. 6c, are created by rotating the rotating means 28 in the direction of the arrow. As a result of the spiral folds 38 being formed, the diameter of the airbag 11 is continuously reduced, while, at the same time, the axial thickness of the airbag 11 increases fractionally, as shown in FIG. 5c.

Although a compactly folded arrangement can be achieved by the one-sided twisting of the flat airbag 11, it is preferable that, as shown in FIGS. 5d and 6d, ring plungers 26, 27, which are axially aligned relative to one another, engage from opposite sides in an intermediate region between the airbag retaining disc 24 and the outer periphery 22 of the airbag 11. It is also preferable that the ring plungers 26, 27 and the twisting means 28, which act at the outer periphery 22 of the airbag 11, be twisted in opposite directions. As a result, as shown in FIGS. 5e and 6e, outer and inner regions 19 and 20, having opposite twisting directions and spiral folds 38, are created. A peripheral region 21 is located between the outer and inner regions 19 and 20 upon which the ring plungers 26, 27 act from opposite axial sides.

Forming plates 18 acting on four or more sides are preferably provided, as shown in FIGS. 5f and 6f, so that a compact packet arrangement 13 can be constructed out of the oppositely twisted flat spiral structures of FIGS. 5e and 6e. The forming plates 18 are used also to compress the initially circular airbag structure to a packet 13 with a desired and basically arbitrary cross-section, which can then be introduced in a suitable manner into a cap.

The expanding gas should preferably already act at the start of the inflation procedure on the regions of the air-bag which are axially furthest from the gas generator in the unfolded state.

A concept underlying the invention is seen in the fact that the folding procedure involves a relative rotation of different regions of the airbag around the axis of the preferably central opening, whereby helical and/or spiral folds are formed and it is ensured that the regions of the airbag lying axially opposite to the gas generator are preferably acted on by the expanding gas from the point at which the gas generator is triggered and on.

Providing oppositely twisted regions of the folded airbag, which has been compacted into a packet, ensures that the rotational movements of the sheet material that occur during inflation of the airbag take place in opposite to that in which they were folded so that no resultant rotary momentum arises.

We claim:

1. A method for packing an airbag of an airbag apparatus for motor vehicles in a container, comprising the steps of:
   (a) providing an airbag, which is formed by two flexible sheets lying flat against each other and being connected together at their peripheries, wherein one of said sheets has an opening with a central axis for receiving a gas generator;
   (b) spacing the sheets of the airbag in a direction of the central axis of the opening, so that at least a small cavity between the sheets is formed;
   (c) rotating different regions of the airbag relative to each other about the central axis of the opening to fold the airbag into a compact packet, said regions being spaced apart axially and/or radially from one another; and
   (d) arranging the airbag after folding it into said compact packet in the container.

2. A method for packing an airbag of an airbag apparatus for motor vehicles in a container, comprising the steps of:

(a) providing an airbag, which is formed by two flexible sheets lying flat against each other and being connected together at their peripheries, wherein one of said sheets has an opening with a central axis for receiving a gas generator;

(b) spacing the sheets of the airbag in a direction of the central axis of the opening, so that at least a small cavity between the sheets is formed;

(c) rotating different regions of the airbag relative to each other about the central axis of the opening to fold the airbag into a compact packet, said regions being spaced apart axially and/or radially from one another;

(d) arranging the airbag after folding it into said compact packet in the container; and reinforcing a part of the sheet having the opening by placing around the opening an airbag holding disc prior to folding for use as a connection flange for connecting the airbag to the gas generator.

3. A method in accordance with claim 1, wherein in the rotating step the flat airbag is folded around the sheet material in the region of the central opening in the direction of the axis of the opening and away from the opening while forming a plurality of radial folds wherein a region axially remote from the opening is rotated about the axis relative to the sheet material in the region of the opening and moved axially towards said sheet material in the region of the opening.

4. A method in accordance with claim 1, wherein in the spacing step, the flat airbag is spaced apart in the direction of the axis of the central opening to such an extent that an umbrella fold is possible, thereafter several radial folds are formed, and wherein a region axially remote from the opening is twisted about the axis relative to the sheet material in the region of the opening and is moved axially towards the sheet material in the region of the opening.

5. A method in accordance with claim 3, wherein in the rotating step, the rotational movements and axial movements are carried out simultaneously.

6. A method in accordance with claim 1, further comprising the step of arranging a hollow die corresponding to the periphery of the compact packet around the folded airbag into which the folded airbag is axially rotated and axially compressed.

7. A method in accordance with claim 6, further comprising the steps of, after completing the compact packet, pushing the container, which is open at one side, onto the hollow die and withdrawing the hollow die axially in the opposite direction.

8. A method in accordance with claim 1, wherein in the rotating step, the flat airbag is twisted by grasping it at its periphery and by rotating it around the axis of the opening relative to the sheet material in the region of the opening so that its diameter is reduced and the airbag is thereby spirally folded, and wherein the compact packet is given the final shape by shaping plates which can be displaced inwardly from the periphery towards the axis.

9. A method in accordance with claim 8, wherein in the rotating step the flat airbag is additionally grasped in a peripheral region with a smaller radius than the radius of said periphery and is twisted at the periphery in the opposite sense to the sheet material in the region of the opening.

10. A method in accordance with claim 1, wherein in the rotating step, the flat airbag is folded around the sheet material in the region of the central opening in the direction of the axis of the opening and away from the opening, while forming a plurality of folds, and wherein a region between end faces of the folded airbag is rotated relative to said end faces about the axis and said end faces are moved towards one another.

11. A method in accordance with claim 1, wherein, in the spacing apart step, the flat airbag is spaced apart in the direction of the axis of the central opening to such an extent than an umbrella fold is possible, and, wherein in the rotating step, several radial folds are formed and a region between end faces of the folded airbag is twisted relative to said end faces about the axis and said end faces are moved towards one another.

* * * * *